United States Patent
Fang et al.

(10) Patent No.: US 12,448,974 B2
(45) Date of Patent: Oct. 21, 2025

(54) CAPACITIVE FLUID DETECTION SYSTEM FOR A PUMP

(71) Applicant: ZOELLER PUMP COMPANY, LLC, Louisville, KY (US)

(72) Inventors: Yao-Yu Fang, Keelung (TW); Yu-Hung Yeh, New Taipei (TW); Tzyy-Yang Tzeng, New Taipei (TW); Fu-Sheng Kao, New Taipei (TW); Thomas Ming-Hui Chiu, Taipei (TW)

(73) Assignee: ZOELLER PUMP COMPANY, LLC, Louisville, KY (US)

( * ) Notice: Subject to any disclaimer, the term of this patent is extended or adjusted under 35 U.S.C. 154(b) by 0 days.

(21) Appl. No.: 18/595,755

(22) Filed: Mar. 5, 2024

(65) Prior Publication Data

US 2025/0283471 A1    Sep. 11, 2025

(51) Int. Cl.
*F04D 15/00* (2006.01)
*G01M 3/16* (2006.01)

(52) U.S. Cl.
CPC .......... *F04D 15/0088* (2013.01); *G01M 3/16* (2013.01)

(58) Field of Classification Search
CPC .......................... F04D 15/0218; G08B 21/18
See application file for complete search history.

(56) References Cited

U.S. PATENT DOCUMENTS

| | | | |
|---|---|---|---|
| 7,264,449 B1 * | 9/2007 | Harned | F04D 15/0218 417/366 |
| 2006/0005622 A1 * | 1/2006 | Burdi | F04B 17/03 73/304 C |
| 2007/0048157 A1 * | 3/2007 | Collins | F04D 15/0218 417/423.3 |
| 2010/0064705 A1 * | 3/2010 | Chauvin | F04B 49/10 700/282 |
| 2011/0110792 A1 * | 5/2011 | Mauro | F04D 13/08 73/304 C |

(Continued)

FOREIGN PATENT DOCUMENTS

| | | |
|---|---|---|
| CA | 2249640 A1 | 9/1999 |
| CN | 101527538 A | 9/2009 |

(Continued)

OTHER PUBLICATIONS

International Search Report and Written Opinion directed to International Application No. PCT/US2025/018362, mailed May 22, 2025; 13 pages.

*Primary Examiner* — Courtney D Heinle
*Assistant Examiner* — Cameron A Corday
(74) *Attorney, Agent, or Firm* — Sterne, Kessler, Goldstein & Fox, P.L.L.C.

(57) ABSTRACT

Disclosed herein are a pump and a method for controlling the pump for detecting a fluid around the pump based on a value detected by a capacitive sensor. The pump may include a motor housing accommodating a motor configured to drive an impeller to discharge fluid. The pump may include a pump cap, located above the motor housing, accommodating a controller configured to drive the motor. The pump may include a sensor box, provided on a side of the pump, accommodating a capacitive sensor. The controller may be configured to drive the motor after determining that a value detected by the capacitive sensor indicates that the fluid is present around the pump.

9 Claims, 5 Drawing Sheets

(56) References Cited

U.S. PATENT DOCUMENTS

| | | | |
|---|---|---|---|
| 2011/0110794 A1* | 5/2011 | Mayleben | F04D 15/0218 |
| | | | 417/313 |
| 2012/0118412 A1* | 5/2012 | Barry | G05D 9/12 |
| | | | 73/304 C |
| 2013/0156605 A1 | 6/2013 | Mayleben et al. | |
| 2021/0095694 A1* | 4/2021 | Garcia | F04D 29/669 |
| 2023/0151819 A1* | 5/2023 | Banjar | F04D 27/00 |
| | | | 417/36 |
| 2023/0274628 A1* | 8/2023 | Ulliman | G08B 21/182 |
| | | | 340/618 |

FOREIGN PATENT DOCUMENTS

| | | |
|---|---|---|
| CN | 119267181 A | 1/2025 |
| WO | 2000043735 A2 | 7/2000 |

* cited by examiner

CAPACITIVE FLUID DETECTION SYSTEM FOR A PUMP

BACKGROUND

A pump is a device that uses mechanical, hydraulic, pneumatic, or electrical energy to move fluids from one place to another, often against a pressure difference or a gravitational force. Pumps are used to provide adequate drainage for both commercial and residential uses. Examples of different types of pumps include sump, sewage, and drainage pumps.

A sump pump is a pump installed in a basin or pit below the ground level, usually in basements, crawl spaces, or other low-lying areas, to collect and remove excess water that may accumulate from rain, groundwater, or flooding. Sump pumps can be placed inside or above a sump basin. Sump pumps prevent water damage, mold growth, and structural problems in buildings and foundations.

A sewage pump is a pump typically used to transport wastewater or sewage from a building to a septic tank, a sewer system, or a treatment plant. Sewage pumps can handle solid waste, organic matter, and other contaminants that may clog or damage other types of pumps. Some sewage pumps are equipped with a grinder, that is, a cutting mechanism to reduce the size of the solids suspended in the fluid. Sewage pumps prevent sanitary and health hazards, odors, and backups in plumbing systems.

A drainage pump is a pump used to remove water from surfaces or subsurfaces, such as fields, gardens, roads, roofs, or mines. Drainage pumps can be portable (moved from one location to another) or fixed (installed permanently in a specific location). Drainage pumps prevent flooding, erosion, and waterlogging in various settings.

Regardless of the environment in which the pumps are used, the important thing is to drain at the right time. For example, if the pump does not drain even though there is fluid in the environment, it will not fulfill its intended purpose. On the other hand, if the pump attempts to drain even though there is no fluid in the surrounding area, it will unnecessarily shorten the life of the product.

There is a known method of controlling the pump with floats in order to drain fluid at the appropriate time. In this method, a float is placed in the basin so that the float rises as fluid accumulates around the pump. When the float rises, a mechanical switch is turned on to activate the pump, thus enabling the pump to be controlled according to the amount of fluid around the pump.

However, control using floats tends to require a large system configuration. In addition, the control using floats has many moving parts, which may not be easy to maintain. Thus, improved systems and methods for controlling pumps are needed.

SUMMARY

According to an embodiment, a pump is provided. The pump may include a motor housing accommodating a motor configured to drive an impeller to discharge fluid. The pump may include a pump cap, located above the motor housing, accommodating a controller configured to drive the motor. The pump may include a sensor box, provided on a side of the pump, accommodating a capacitive sensor. The controller may be configured to drive the motor after determining that a value detected by the capacitive sensor indicates that the fluid is present around the pump.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

This disclosure generally relates to fluid detection around a pump. In particular, this disclosure may relate to technology that makes it possible to control the pump to run or stop in response to changes in a surrounding environment by installing a capacitive sensor on the pump. A capacitive sensor may reduce the need for mechanical parts, which may improve reliability of the pump.

Another aspect of this disclosure may relate to a preventive function of the pump. If an environment in which the pump is placed is poor or if maintenance is inadequate, the pump may tip over or gunk may adhere to the pump, preventing it from performing as intended. To address these problems, according to this disclosure, the pump can perform the preventive function by detecting tipping over and gunk buildup based on the value detected by the capacitive sensor.

Figure 1:
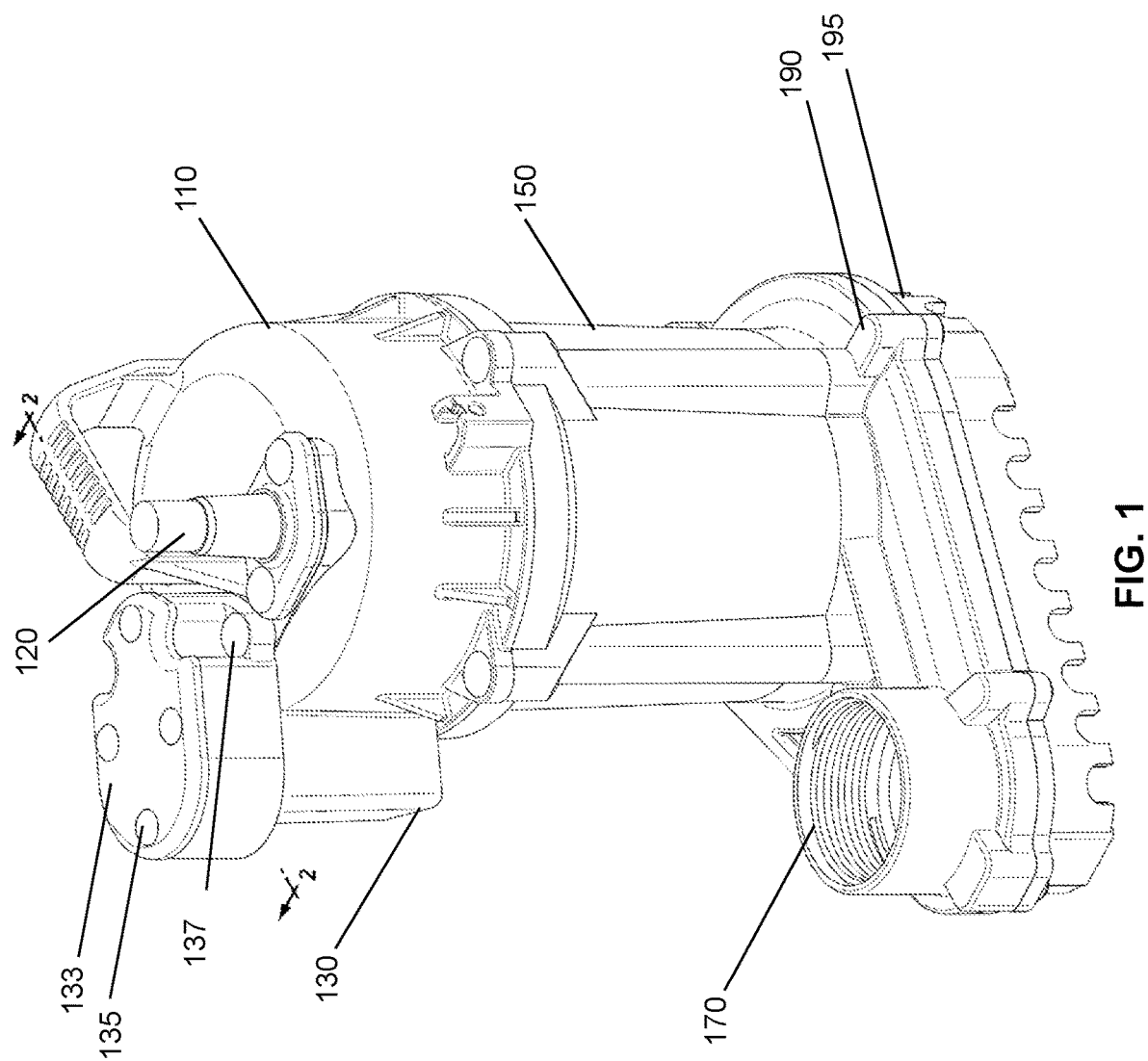
FIG. 1 is a perspective view of a pump, according to some embodiments.

FIG. 1 is a perspective view of a pump 100, according to some embodiments. The pump 100 may include a pump cap 110, a power cord 120, a sensor box 130, a motor housing 150, a discharge outlet 170, a pump housing 190, and a base 195.

The pump cap 110 may be located above the motor housing 150. The pump cap 110 may accommodate electrical components. The pump cap 110 may be made of non-conductive material, such as plastics or polymers. Details of the pump cap 110 are described below.

The power cord 120 may penetrate the pump cap 110 and supply power to the pump 100. The top of the power cord 120 may be connected to an external power source. The external power source may, for example, be household electrical power, e.g., 120 volts alternating current.

The sensor box 130 may be provided on a side of the pump cap 110. The sensor box 130 may accommodate a capacitive sensor. The capacitive sensor may be a non-contact sensor that can detect surrounding objects by detecting changes in ambient capacitance. From the pattern of capacitance changes, it is possible to estimate what kind of objects are in the surrounding area.

The sensor box 130 may be made of non-conductive material, such as plastics or polymers. Screws 135 secure a lid 133 of the sensor box 130, and a screw 137 secures the sensor box 130 to the pump cap 110. Both screws 135 and 137 may be made of metal. Details of the sensor box 130 are described below.

The motor housing 150 may accommodate a motor to drive the pump. Details of the motor housing 150 are described below.

The discharge outlet 170 may discharge fluid pumped by the pump 100. A discharge pipe, not shown in FIG. 1, may be connected to the discharge outlet 170 to discharge the fluid to the outside.

The pump housing 190 may be provided underside of the motor housing 150. The pump housing 190 may accommodate an impeller driven by the motor. The base 195 may be provided underside of the pump housing 190.

Figure 2:
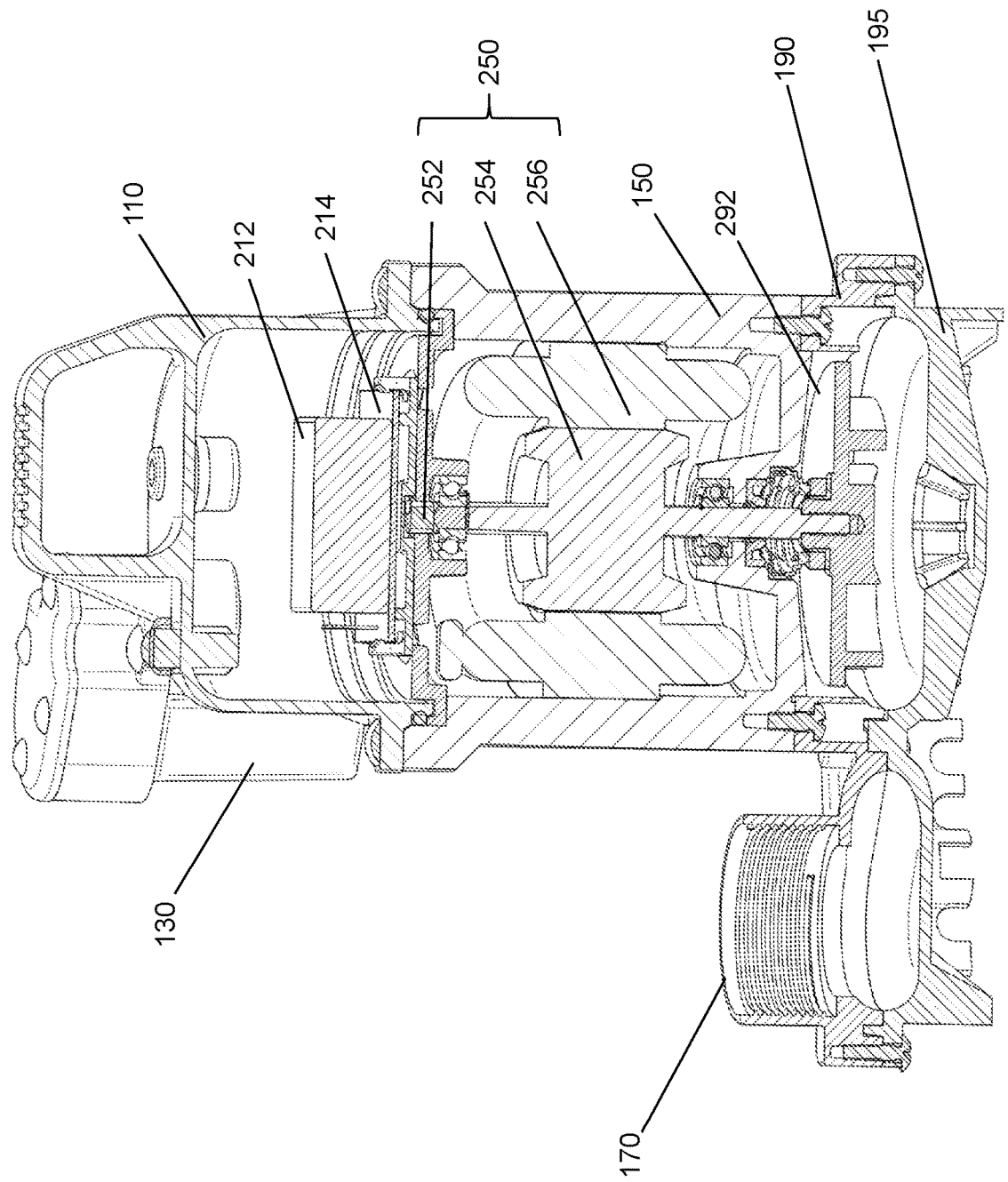
FIG. 2 is a cross section of the pump, according to some embodiments.

FIG. 2 is a cross section of the pump 100 along the 2-2 cross-section of FIG. 1, according to some embodiments. The pump cap 110 may accommodate a run capacitor 212 and a printed circuit board (PCB) 214.

The run capacitor 212 may provide starting torque to the motor by supplying voltage to the motor.

The PCB 214 may be a board where a hall sensor, a timer, a controller, and other electronic components necessary to control pump 100 are mounted. The hall sensor may detect a rotational speed of the motor, as a speed sensor. The timer may measure the time required to control the pump 100. The controller may control the electronic components that make up the pump 100.

The motor housing 150 may accommodate a motor 250. The motor 250 may include a magnet 252, a rotor 254, and a stator 256. The magnet 252 is located at the bottom of the PCB 214. The hall sensor located on the PCB 214 detects the magnetic force of the magnet 252 to sense the rotational speed of the motor 250. The rotor 254 may rotate when power is supplied to the motor 250. The stator 256 may accommodate a laminated core and coils and generate a magnetic field to rotate the rotor 254. A portion of the motor housing 150 may be filled with motor oil to lubricate the components of the motor 250.

The pump housing 190 may accommodate an impeller 292. The impeller 292 may be connected to the rotor 254 and rotate as the rotor 254 rotates. As the impeller 292 rotates, the fluid around pump 100 may be discharged through the discharge outlet 170.

Figure 3:
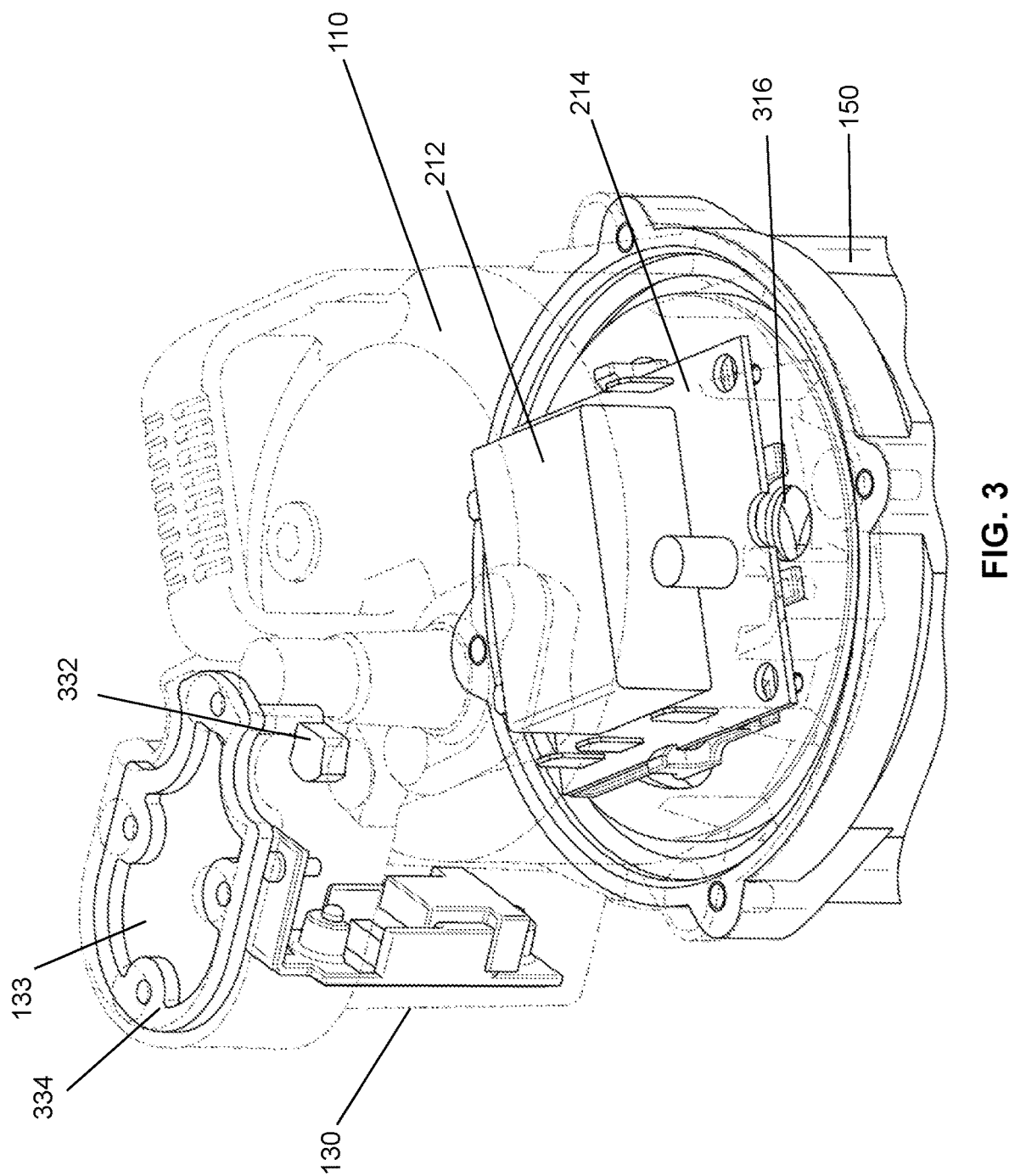
FIG. 3 is an enlarged diagram illustrating an internal structure of a pump cap, according to some embodiments.

FIG. 3 is an enlarged diagram illustrating an internal structure of the pump cap 110, according to some embodiments. As illustrated in FIG. 3, there may be a hole 316 between the pump cap 110 and the motor housing 150. The motor oil may enter the pump cap 110 through the hole 316 when the pump 100 is tipped over.

The sensor box 130 may include a seal 332 between the sensor box 130 and the pump cap 110. The seal 332 may prevent the motor oil from entering the sensor box 130. The seal 332 may be made of silicone.

The sensor box 130 may also include a gasket 334 between the lid 133 and the sensor box 130. The gasket may prevent the fluid from entering the sensor box 130. The gasket 334 may be made of rubber.

Figure 4:
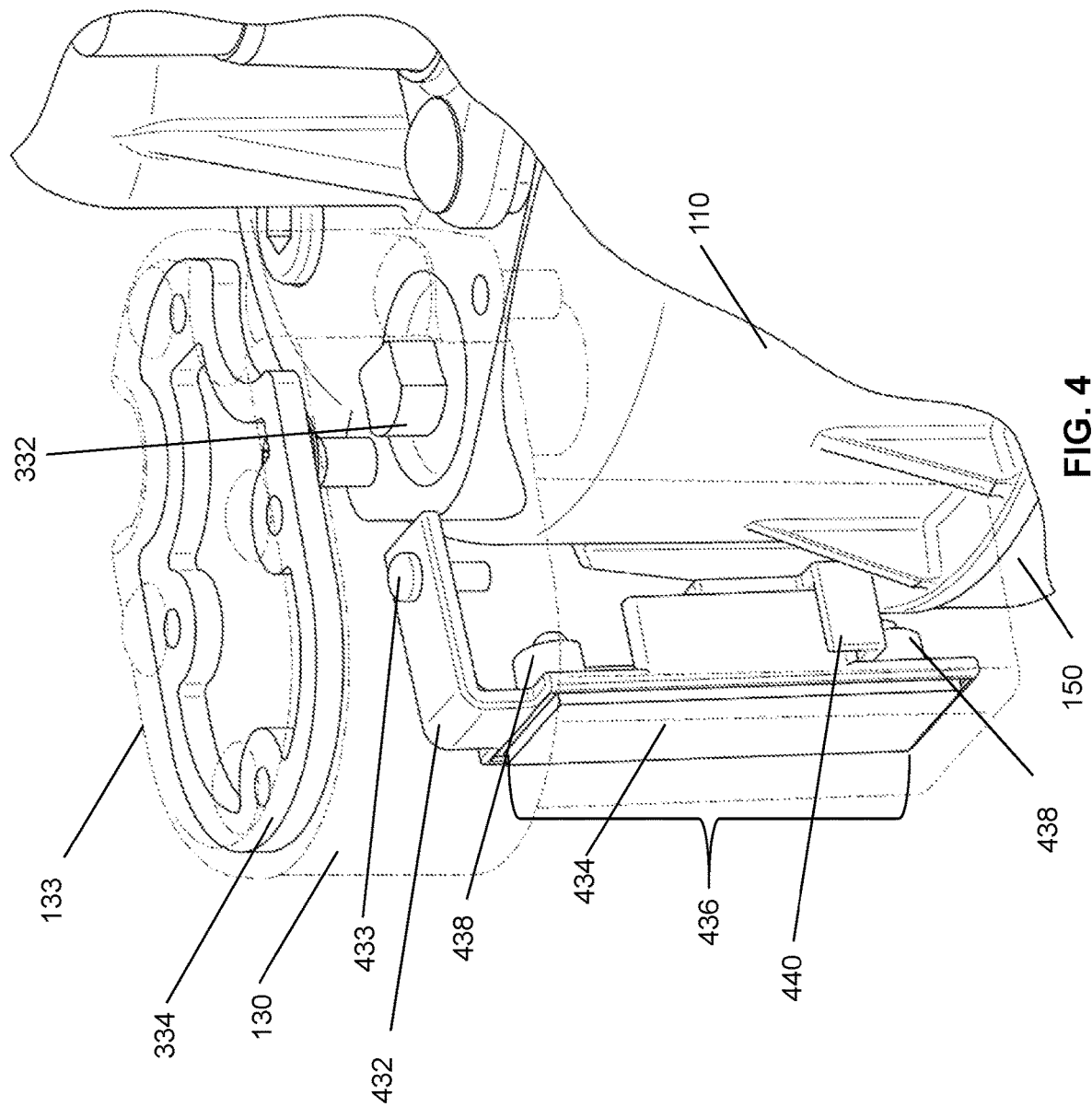
FIG. 4 is an enlarged diagram illustrating an internal structure of a sensor box, according to some embodiments.

FIG. 4 is an enlarged diagram illustrating an internal structure of the sensor box 130, according to some embodiments. A PCB support part 432 may be an about inverted L-shaped bracket. One side of the PCB support part 432 may be secured to the sensor box 130 by a screw 433, approximately parallel to the installation surface of the pump 100. A sensor 434 may be secured to the other side of the PCB support part 432 by screws 438. The sensor 434 may be a capacitive sensor. As represented in FIG. 4, the one side and the other side of the PCB support part 432 are nearly perpendicular to each other. The PCB support part 432 may be made of non-conductive material, such as plastics or polymers. A rubber gasket 440 may securely attach the PCP support part 432 and a sensor 434 to the sensor box 130.

A sensing surface 436 may be secured by the PCB support part 432 to contact an inner side of the sensor box 130 so that the sensing surface 436 faces outward of the pump 100. In this way, the sensor 434 can detect changes in the external environment of the pump 100. The elasticity of the rubber gasket 440 may allow the sensing surface 436 to more firmly contact the inner surface of the sensor box 130.

As shown in FIG. 4, the sensor box 130 or the sensing surface 436 may be located on the side of the pump cap 110. In this way, it is possible to detect an abnormal situation where the fluid is coming close to the pump cap 110, since the sensing surface 436 can detect changes in capacitance around the pump cap 110. Also, it is possible to detect an abnormal situation where the pump 100 has tipped over. This is because if the pump 100 has tipped over, the motor oil may enter the pump cap 110 and the sensing surface 436 may detect changes in capacitance inside the pump cap 110. Further, it is possible to prevent gunk from sticking to the sensor box 130, since the fluid is unlikely to reach the sensor box 130 during normal operation.

As shown in FIG. 4, the sensor box 130 or the sensing surface 436 may be located above the motor housing 150. In this way, a negative influence from the motor housing 150 to the sensor 434 can be reduced. As described, even if the lid 133 is installed above the pump cap 110, the PCB support part 432 allows the sensing surface 436 to be installed side of the pump cap 110.

As shown in FIG. 4, the lid 133 may be placed above the pump cap 110. In this way, the sensor box 130 can be accessed even if the fluid has reached a height above the pump cap 110.

Figure 5:
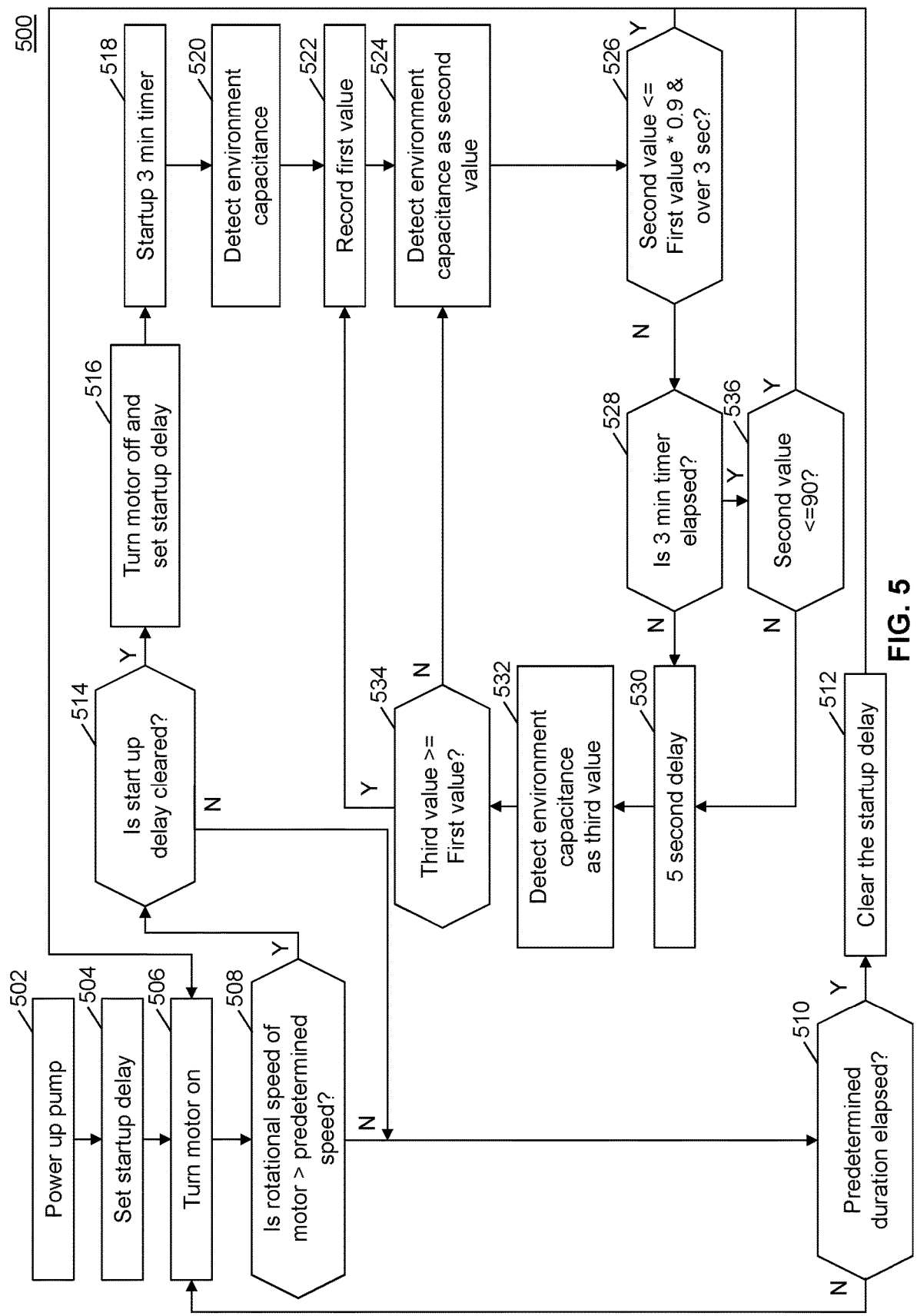
FIG. 5 is a flowchart for a method for operating the pump, according to some embodiments.

FIG. 5 is a flowchart for a method 500 for operating the pump 100, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5 as will be understood by a person of ordinary skill in the art. Method 500 shall be described with reference to FIGS. 1-4. However, method 500 is not limited to that example embodiment. Also, although descriptions of the method 500 often uses the pump 100 as the operating entity, it will be clear to those skilled in the art that the actual operating entity can be a controller or the sensor 434 or other component of the pump 100.

At 502, the pump 100 may be powered on. The pump 100 may be powered on by the power cord 120 connected to a power source.

At 504, the pump 100 may set a startup delay. The startup delay may be a period of time during which pump 100 forces the motor 250 to rotate after powered on.

At 506, the pump 100 may turn the motor 250 on. The motor 250 may run during the startup delay period to drain the fluid that has accumulated before the power is turned on and also to detect abnormalities during initial operation.

At 508, the pump 100 may determine whether a rotational speed exceeds a predetermined speed. For example, the controller can 1) detect ten rising edges of the hall sensor provided on the PCB 214 to determine the rotational speed of the motor 250 2) detect ten rising edges of an AC line connected to the motor 250 to determine the predetermined speed. After detecting both series of edges, the controller may calculate the cycle of each edge and determine "Yes" in 508 if the cycle of the hall sensor edge minus the cycle of the AC line edge is less than one-third the cycle of the AC line edge.

The above calculation method is only an example. The operation in 508 may be explained that the pump 100 detects the presence or absence of the fluid around the pump 100 based on the rotational speed of the motor 250. This is because the relationship between the frequency given to the motor 250 and the frequency at which the motor 250 is actually rotating depends on how much fluid the impeller 292 is stirring. In other words, the decision of 508 can be determined in other ways, e.g., based on the absolute speed of the impeller 292 or the resistance the impeller 292 receives from the fluid.

During 506 and 508, the pump 100 may detect abnormal operation. For example, if one of the periods of the AC line and the hall sensor exceeds 15 Hz, the pump 100 may determine that there is a fault in signal detection. This is because it may indicate that either the current to the motor 250 or the rotation of the impeller 292 is significantly slower. In such a case, pump 100 may immediately stop the motor 250, set a new startup delay, and the operation returns to 506 after a predetermined delay (e.g. sixty seconds) has been elapsed.

At 510, if the pump 100 determined that the rotational speed does not exceed the predetermined speed at 508, the pump 100 may determine whether the predetermined duration has been elapsed since the last startup delay. The predetermined duration may be fifteen seconds. If the pump 100 determines that the predetermined duration has not been elapsed, the operation returns to 506.

During 508 and 510, the pump 100 may detect abnormal operation. For example, if the cycle of the hall sensor is greater than or equal to twice the cycle of the AC line, the pump 100 may determine that there is a slippage of the impeller 292. In such a case, pump 100 may immediately stop the motor 250, set a new startup delay, and the operation returns to 506 after a predetermined delay (e.g. ninety seconds) has been elapsed.

At 512, if the pump 100 determines that the predetermined duration has been elapsed at 510, the pump may clear the startup delay and the operation returns to 506.

At 514, if the pump 100 determined that the rotational speed exceeds the predetermined speed at 508, the pump 100 may determine whether the startup delay has been cleared. If the startup delay has not been cleared, the operation proceeds to 510.

At 516, if the pump 100 determined that the startup delay has been cleared, the pump may turn the motor 250 off and set a new startup delay. In this way, if the rotational speed of the motor 250 is greater than a predetermined speed, the motor 250 stops rotating because the fluid stirred by the impeller 292 has most likely decreased. The pump 100 may set a five seconds delay between turning off the motor 250 and setting the new startup delay.

At 518, the pump 100 may startup a three-minute timer. The three-minute period may be intended to prevent the motor 250 from turning on and off excessively in short periods of time. Therefore, the duration of the timer started in 518 is not limited to three minutes, but can be five minutes, eight minutes, or any other arbitrary duration.

At 520, the pump 100 may detect an environment capacitance. The environment capacitance may be a capacitance value detected by the sensor 434. The sensing surface 436 of the sensor 434 can sense the capacitance value of the environment surrounding the pump 100, as described using FIGS. 1-4. How the capacitance value detected by the sensor 434 is quantified depends on the type of sensor 434. As an example, this disclosure describes the use of the sensor 434 that detects a capacitance value of approximately 100 or more when the majority of the area around the pump 100 is occupied by air.

At 522, the pump 100 may record the capacitance value detected in the previous operation as a first value. The first value recorded in this way may serve as a reference value detected in a condition where there is a high probability that no fluid is present in the surrounding area, since the rotational speed exceeds the predetermined speed. The pump 100 then may determine whether or not fluid is present in the surrounding area by comparing it to the value detected after the first value as described below.

At 524, the pump 100 may detect an environment capacitance and record the detected capacitance value as a second value. As explained, the first value may be the value detected in the condition where there is a high probability that no fluid is present in the surrounding area. However, over time, fluid may accumulate around the pump 100. Therefore, the pump 100 may detect the environment capacitance as the second value after detecting the first value, allowing fluid detection based on changes in the capacitance value.

At 526, the pump 100 may determine whether the second value is less than or equal to 0.9 times the first value over 3 seconds. If the second value is less than or equal to 0.9 times the first value over 3 seconds, the operation returns to 506 to drive the motor 250. The decrease in the second value detected after the first value may mean that the fluid is present around the pump 100 over time. Therefore, the pump 100 may drive the motor 250 to discharge the fluid. The coefficient value of 0.9 is an example and may be changed depending on the application and location of use of the pump 100. The determination of 526 may be made simply based on the difference between the first and second values without using coefficients.

At 528, if the pump 100 determined "no" at 526, the pump 100 may determine whether the three-minute timer has been elapsed. This operation may prevent an operation in 536 from being processed an excessive number of times in a short period of time and prevent the motor 250 from being turned on and off frequently.

At 530, if the pump 100 determined the three-minute timer has not been elapsed, the pump 100 may set a five seconds delay. In this way, the pump 100 can prevent excessive acquisition of new environment capacitance.

At 532, the pump 100 may detect an environment capacitance and record the detected capacitance value as a third value. In this way, the first value, which is the reference value, can be updated at 534 described below.

At 534, the pump 100 may determine whether the third value is greater than or equal to the first value. The fact that the third value is greater than or equal to the first value may indicate that that the fluid is less likely to be present around the pump 100.

If the third value is greater than or equal to the first value, the operation returns to 522 and the pump 100 may overwrite the first value using the third value. In this way, the first value, which may be a reference value, can be updated to a higher value in response to changes in the environment, so that the motor 250 is rotated more actively. It also prevents the motor 250 from not rotating if, for some reason, the first value is detected as smaller than it actually is. If the third value is less the first value, the operation returns to 524.

At 536, if the pump 100 determined "yes" at 528, the pump 100 may determine whether the second value is greater than or equal to a predetermined threshold. In this disclosure, 90 may be used as the predetermined threshold as one example. The predetermined threshold in 536 may be above the value that the sensor 434 detects when there is some foreign substance (e.g., debris, gunk, motor oil, floor surface), around the sensor box 130, but below the value it detects when most of the area around the pump 100 is atmosphere. The value that the sensor 434 detects when there is some foreign substance may be higher than the value that the sensor 434 detects when the fluid is present around the pump 100.

The operation 536 may be called a protective function. The protective function can protect the pump 100 from accidents. For example, by operation 536, the pump 100 can drive the motor 250 after detecting that that the pump 100 is tipped over. As explained above, at least a portion of the motor housing 150 is filled with the motor oil and the motor oil may enter the pump cap 110 as the pump 100 tips over. Then the pump 100 can detect that the value detected by the sensor 434 indicates that the motor oil is present around the sensor box 130 (e.g., the value <=90). In other words, it can be inferred that the pump 100 has tipped over based on the value detected by the sensor 434.

The protective function can also detect the presence of the foreign substance around the sensor box 130. If debris or gunk adheres to the sensor box 130 due to long-term use of the pump 100, the reliability of the values detected by the sensor 434 may decrease. To prepare for such an eventuality, the pump 100 can determine whether the value detected by the sensor 434 indicates that a foreign substance has been detected (e.g., the value <=90).

If the pump 100 determines that the second value is greater than or equal to the predetermined value, in other words determines that the protective function may be required, the operation may return to 506 and the pump 100 may drive the motor 250. If the operation transitions from 536 to 506, it is likely that the protective function is required, so a special action may be taken by the pump 100 at 506. For example, the pump 100 may sound an alarm or perform other actions to inform the user of the pump 100 of an abnormality.

If the pump 100 determines that the second value is less than the predetermined value the operation proceeds to 530.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A pump comprising:
   a motor housing accommodating a motor configured to drive an impeller to discharge fluid;
   a pump cap, located above the motor housing, accommodating a controller configured to drive the motor; and
   a sensor box, provided on a side of the pump, accommodating a capacitive sensor;
   wherein the controller is configured to (i) drive the motor after determining that a value detected by the capacitive sensor indicates that fluid is present around the pump, wherein determining that the value detected by the capacitive sensor indicates that the fluid is present around the pump is determined based on a difference between a first value and a second value, wherein the first value is detected by the capacitive sensor, and the second value is detected by the capacitive sensor after detecting the first value, and (ii) overwrite the first value with a third value after detecting that the third value indicates that the fluid is less likely to be present around the pump than the first value does, and the third value is detected by the capacitive sensor after detecting the second value.

2. The pump of claim 1, wherein the difference between the first value and the second value comprises a difference between the first value multiplied by a predetermined coefficient and the second value.

3. The pump of claim 1, further comprising:
a speed sensor configured to detect a rotational speed of the motor;
wherein the first value is detected after determining that the rotational speed of the motor exceeds a predetermined speed with the motor being driven.

4. The pump of claim 1, wherein the controller is further configured to drive the motor after detecting that the value detected by the capacitive sensor indicates a presence of foreign substance around the pump.

5. The pump of claim 4, wherein detecting that the value detected by the capacitive sensor indicates the presence of the foreign substance around the pump comprises comparing the value detected by the capacitive sensor with a predetermined threshold.

6. The pump of claim 1, wherein the sensor box is provided on a side of the pump cap and above the motor housing.

7. The pump of claim 6, wherein the controller is further configured to drive the motor after detecting that the value detected by the capacitive sensor indicates that the pump is tipped over.

8. The pump of claim 7, wherein at least a portion of the motor housing is filled with motor oil, the motor oil enters the pump cap as the pump tips over, and detecting that the value detected by the capacitive sensor indicates that the pump is tipped over comprises detecting that the value detected by the capacitive sensor indicates that the motor oil is present around the sensor box.

9. The pump of claim 6, wherein the capacitive sensor has a sensing surface, and the sensing surface is secured by a support part to contact an inner side of the sensor box so that the sensing surface faces outward, and the sensor box, the pump cap, and the support part are made of non-conductive material.

* * * * *